Figures 1, 2:
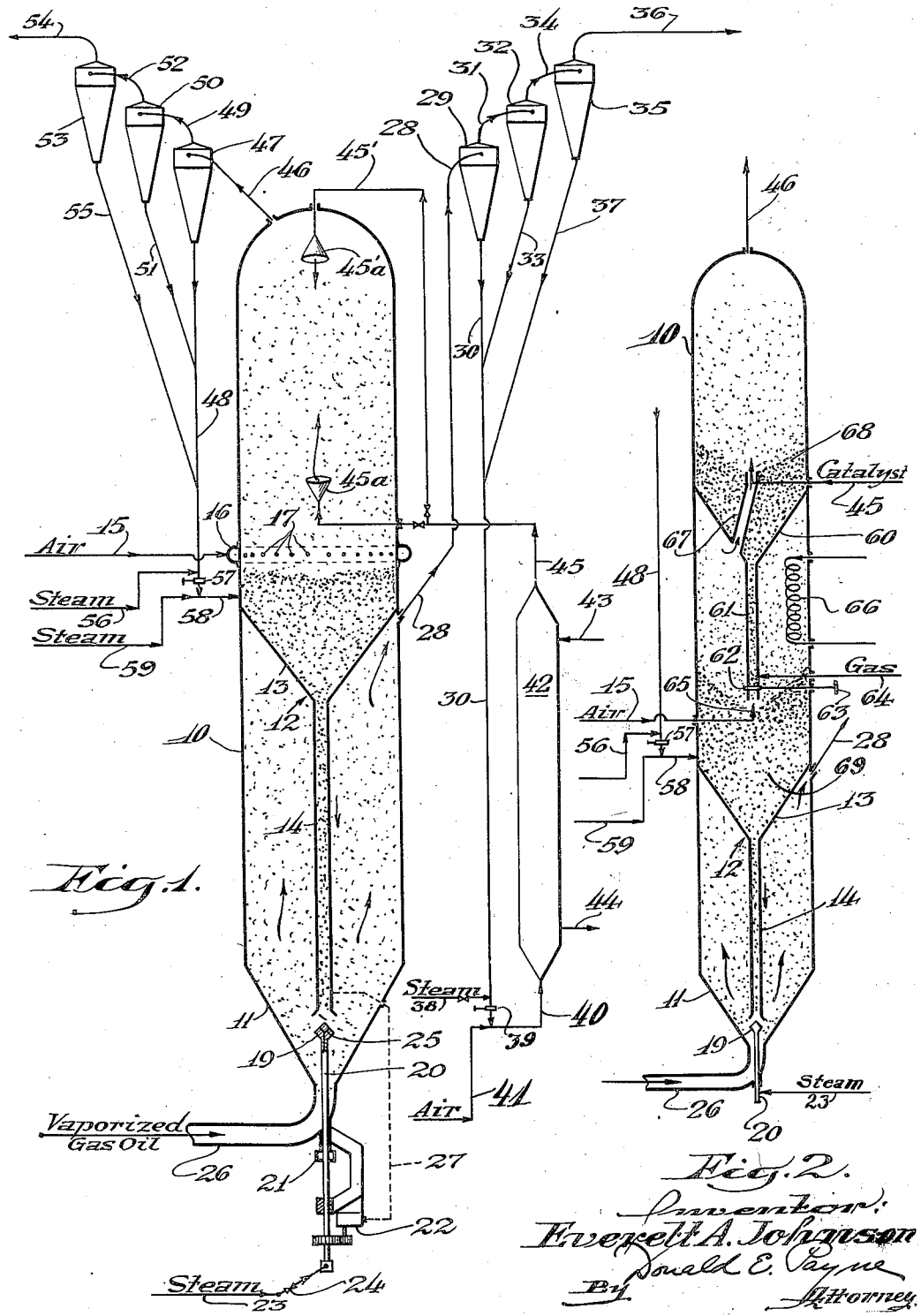

Nov. 15, 1949

E. A. JOHNSON 2,488,033

CATALYTIC CONVERSION SYSTEM

Filed May 10, 1941

Inventor:
Everett A. Johnson
By Donald E. Payne
Attorney

Patented Nov. 15, 1949

2,488,033

UNITED STATES PATENT OFFICE 2,488,033

CATALYTIC CONVERSION SYSTEM

Everett A. Johnson, Park Ridge, Ill., assignor to Standard Oil Company, Chicago, Ill., a corporation of Indiana Application May 10, 1941, Serial No. 392,847

7 Claims. (Cl. 196—52)

This invention relates to a catalytic conversion system and it pertains more particularly to a system for handling finely divided or powdered catalyst which is alternately on-stream and undergoing regeneration. The invention will be described as applied to a process for cracking gas oil or heavier hydrocarbons for the production of high quality motor fuel and it should be understood that the invention is applicable to other hydrocarbon conversion processes and, in fact, to any conversion process wherein a powdered catalyst promotes a reaction while suspended in gases or vapors. Catalyst may then be separated from reaction products and regenerated while suspended in a regeneration gas and be finally separated from the regeneration gas and returned to the conversion step.

Certain of the features of apparatus and operation herein set forth are separately described and claimed in the following applications: Page Ser. No. 376,763, filed January 31, 1941; Scheineman Ser. No. 392,848, filed May 10, 1941; Scheineman Ser. No. 400,956, filed July 3, 1941; and Gunness Ser. No. 400,958, filed July 3, 1941. Related applications include Johnson Ser. No. 392,846, filed May 10, 1941 and Scheineman Ser. No. 400,566, filed April 27, 1942.

Catalytic cracking processes employing the powdered or fluid type catalyst system have heretofore required separate units for effecting the conversion and regeneration respectively. Furthermore the systems heretofore designed for large scale commercial operations have required superstructures as high as 200 to 250 feet. An object of my invention is to provide a more compact arrangement of reactor and regenerator, preferably combining them in a single unit, and to decrease the necessary height of superstructure by at least 50 to 100 feet. A further object is to decrease the cost of a catalytic conversion unit of given capacity. A further object is to provide a new and improved method and means for regenerating spent catalyst and for returning regenerated catalyst directly to a conversion step. A further object is to minimize heat radiation losses and to improve the overall efficiency of the process and the simplicity of its operation.

A further object of the invention is to provide an improved method and means for accomplishing a countercurrent regeneration of catalyst material whereby the catalyst is initially contacted with regeneration gases of dilute oxygen concentration and is finally contacted with regeneration gases of high oxygen concentration. In other words, an object is to effect a more complete regeneration of catalyst than has been possible in previous regeneration systems.

When applying my invention to a 10,000 barrel per day catalytic cracking plant I may employ a single vertical tower about 25 feet or more in diameter and about 100 feet in height. This tower may be provided with a cone-shaped bottom and a funnel-shaped partition for separating the regeneration section of the tower from the conversion section thereof. Catalyst is regenerated in the top of this tower by air introduced at spaced points in a plane above the funnel-shaped partition. The regenerated catalyst settles in the partition funnel and is conducted by the tubular section of the funnel to the lower part of the tower where it is dispersed into incoming hydrocarbon vapors.

Reaction products and vapors together with suspended catalyst are withdrawn from the tower at a point below the funnel-shaped baffle and are conducted to separators outside of the tower and above or adjacent the top thereof. The separated catalyst may be repressured in a standpipe, passed upwardly through a cooler and introduced into the upper part of the tower wherein carbonaceous matter is burned from the catalyst. The bulk of the catalyst in the regenerator settles by gravity into the funnel-shaped member and is ready for reuse. Residual regenerated catalyst is separated from regeneration gases by cyclone separators and then returned to the body of settled catalyst.

In the upper part of the regenerator catalyst is maintained in a dense turbulent suspension in hot regeneration gas of relatively low oxygen concentration. In the lower part of the regenerator or in a lower regeneration zone the partially regenerated catalyst is maintained in a dense turbulent suspension in a regeneration gas of high oxygen concentration. The catalyst is thus more completely regenerated than has been possible in previous systems of this type.

One feature of my system is its simplicity and its avoidance of the expansion problems that arise when parallel towers are employed with criss-cross standpipes connecting the top of one tower with the base of the other. Another feature of the invention is the savings in construction cost which are obtainable by a more effective utilization of the pressures in various parts of the system and the avoidance of the unduly long standpipes that have heretofore been required. An important feature of the invention is the countercurrent regeneration which is effected without the necessity of employing centrifugal separators between regeneration stages.

The invention will be more clearly understood from the following detailed description and from the accompanying drawings which form a part of the specification and in which:

Figure 1 is a schematic vertical section of one embodiment of my unitary reaction-regeneration system, and Figure 2 is a schematic vertical section through a modified form of the system for obtaining even more efficient countercurrent regeneration.

The invention will be described as applied to a 10,000 barrel per day catalytic cracking plant for Mid-Continent gas oil and the conditions will be set forth for producing about a 45% yield of high anti-knock motor fuel. The catalyst for this process is preferably of the silica-alumina or silica-magnesia type. An example of the silica-alumina catalyst is acid treated bentonite of the type commonly marketed as Superfiltrol. The catalyst is preferably in finely divided form, i. e., its particle size may range from about 2 to 100 microns, preferably about 10 to 50 microns in size. The bulk density of the catalyst when aerated at a gas velocity of about .05 to .5 feet per second may be about 25 to 35 pounds per cubic foot. With gas or vapor velocity of about 1 to 3 feet per second the bulk density of the catalyst may be about 10 to 20 pounds per cubic foot. No invention is claimed in the specific catalyst and since such catalysts are well known in the art no further description thereof is necessary.

In my conversion system the regenerator may be directly superimposed over the reactor. Both the regenerator and the reactor may be of various shapes or sizes, i. e., may be conical, cylindrical or spherical vessels but in any case the regenerator is provided with a conduit for introducing regenerated catalyst directly into the reactor. In the embodiment illustrated in Figure 1, tower 10 may be about 90 to 100 feet high and about 25 feet or more in diameter. This tower is provided with a cone-shaped bottom 11. About 25 or 30 feet from the tower bottom a funnel-shaped partition 12 is provided, the conical outer walls 13 of which are securely welded to the walls of tower 10 and the tubular center section 14 of which extends to a point adjacent the lower part of cone-shaped bottom 11. The space within the tower which surrounds pipe 14 between cone-shaped members 11 and 13 constitutes the reaction section or the reactor in which hydrocarbon conversion is effected.

About half way up the tower and in the upper section thereof I provide means for introducing air for effecting catalyst regeneration. The air may be introduced through line 15 into a tube ring or tuyére 16 which may surround the tower wall and which may be provided with orifices or branch lines 17 for directing the introduced air horizontally into the tower so that immediately above the plane of this tube ring or tuyére there will be a sheet or blanket of upwardly moving air. The catalyst, which is regenerated for the most part in the upper part of the regenerator, must settle downwardly through this blanket of high oxygen concentration. Since the catalyst is at a temperature of about 1000° F. and is already substantially freed from carbonaceous deposit, combustion of any remaining carbonaceous material from the catalyst in this intermediate zone will take place before the catalyst reaches the bottom of the regenerator section.

The catalyst which thus settles to cone-shaped bottom 13 flows downwardly through pipe 14 and may be admitted into the reactor section of the tower in amounts regulated by valve closure 19 which is mounted on hollow stem 20 extending through stuffing box 21 to external operating means 22. Steam may be introduced through line 23 in amounts regulated by valve 24 and discharged through ports 25 at the upper part of closure member 19. When valve 19 is closed the introduced steam aerates the catalyst in pipe 14 and aerates catalyst in the space above cone-shaped member 13 although additional aerating gas may be introduced into this enlarged catalyst storage section of the tower for effecting desired aeration and stripping. When valve 19 is open the steam introduced through line 23 and ports 25 disperses catalyst into the reaction space.

The gas oil charging stock is vaporized in a conventional pipe still (not shown) and introduced at the base of the reactor through line 26 at a temperature of about 850 to 1000° F., for example about 900 to 925° F., and at a gauge pressure of about atmospheric to about 25 pounds per square inch, for example about 13 pounds per square inch. Regenerated catalyst in the lower part of pipe 14 may be at a pressure of about 20 pounds per square inch so that this catalyst will flow downwardly and into the reactor in amounts regulated by valve closure member 19. The weight ratio of catalyst so introduced to oil introduced may be about 1:1 to 10:1, for example about 4:1. The catalyst may be at a temperature of about 950 to 1000° F., for example about 975° F.

The catalyst may be dispersed into the incoming vapors by steam introduced through line 23 and ports 25. It will thus be seen that in view of pressure differentials and the method of injecting the catalyst, reaction vapors will be prevented from entering pipe 14. My invention is not limited to the use of any particular type of valve or aeration means at the base of pipe 14 and it should be understood that I may employ any desired type of valve mechanism, star feeder or the like. It is important, however, to insure against the passage of reaction vapors into pipe 14 and I, therefore, prefer to provide automatic means indicated by dotted line 27 for tightly closing the bottom of pipe 14 when the pressure in the bottom of this pipe is not at least four or five pounds higher than the pressure in the bottom of the reactor.

The upward vertical velocity of charging stock vapors and steam in the reactor may be from about 1 to 3 feet per second, preferably 1½ to 2 feet per second. This provides for a dense catalyst phase in the reactor and for a vapor contact time of about 10 to 15 seconds. A uniform temperature of about 925° F. prevails throughout the entire reactor.

Reaction products may leave the top of the reactor at a pressure of about 9 pounds per square inch through line 28 carrying suspended catalyst out of the reactor at substantially the same rate as regenerated catalyst is introduced thereto. Line 28 leads to a primary separation zone 29 which may be a cyclone separator or an enlarged settling chamber or a combination of settling chamber and cyclone separator. This separator may be superimposed on the top of tower 10 or along side of the tower and the pressure in this primary separator may be about 6 to 8 pounds per square inch depending upon the length and size of line 28. In the drawing I have illustrated a cyclone separator 29 operating at the pressure of about 6½ pounds per square inch and discharging spent catalyst into the top of standpipe 30 which may be about 70 or 80 feet high.

Vapors from the primary separator are introduced by line 31 to secondary cyclone separator 32 which is at a sufficiently higher elevation than the primary cyclone so that the head of separated catalyst in pipe 33, which discharges into standpipe 30, will compensate for the lower pressure in separator 32, which may operate at about 6 pounds per square inch. Vapors from separator 32 are introduced by line 34 to tertiary cyclone 35 which is preferably at a still higher elevation and which may operate at about 5½ pounds per square inch so that the final vapors may be introduced by line 36 into a fractionation system at a pressure of about 5 pounds gauge. Separated catalyst from cyclone 35 is returned by line 37 to standpipe 30.

Any type of fractionation system may be employed for removing gas oil, gasoline and gas fractions, scrubbing the last traces of catalyst out of the reaction products, removing the condensed water, etc. Since this fractionation system forms no part of my present invention it will not be described in further detail.

Standpipe 30 is aerated by steam introduced through line 38 and if desired additional aeration or stripping steam may be employed in primary separator 29. The pressure at the base of standpipe 30 may be about 18 or 20 pounds per square inch. Catalyst from the base of this standpipe is introduced in amounts regulated by valve or star feeder 39 into pipe 40 in which it is suspended in air or other carrier gas introduced through line 41 at a pressure of about 14 or 15 pounds per square inch. The spent catalyst is then passed upwardly to the tubes of heat exchanger 42 wherein it may be cooled to a temperature of about 400 to 850° F. depending upon the amount of carbonaceous material which must be burned therefrom in the regenerator. A cooling fluid may be introduced into the cooler 42 through line 43 and withdrawn through line 44. Thus for example, water may be introduced and steam may be generated at desired pressure in this exchanger. The cooled catalyst is then passed by line 45 into the regenerator section of the tower at a point above the air inlet tuyére 16.

Sufficient air is introduced into the regeneration system through line 15, tuyére 16 and orifices 17 to provide an upward gas velocity between the tuyére and the point of catalyst inlet of about .5 to 2, for example about 1 to 1½ feet per second. The catalyst may be introduced through line 45 and dispersed in the upper part of the regenerator by means of conical distributor 45a. Alternatively, it may be carried to the top of the tower through line 45' and introduced through distributor 45a'. In either case the catalyst in the upper part of the tower is suspended and maintained in turbulent condition for a sufficient period of time to effect the combustion of most of the carbonaceous deposits therefrom. A substantially uniform temperature of about 1000° F. prevails throughout the entire regeneration tower and the introduced catalyst is almost instantaneously dispersed through the entire upper part of the regeneration zone. The point of catalyst introduction may be near air distributors 17 but I prefer to introduce the catalyst at a point about one-third the distance from air distributors to the top of the tower. At this point of catalyst introduction the pressure in the tower may be about 11 or 12 pounds per square inch.

It should be noted that while most of the carbonaceous material is burned from the catalyst in the dense turbulent zone in the upper part of the tower, the final combustion of carbonaceous material which settles out in the regenerator is effected in the zone where substantially pure air is introduced. In other words, I obtain a countercurrent effect whereby the bulk of the deposits are burned with a gas of relatively small oxygen content but wherein the catalyst passes through a blanket of gas of high oxygen content before it reaches the base of the regenerator. As soon as the catalyst particles pass air inlets 17 any residual oxygen containing gas is removed therefrom by the stripping gases passing upwardly through pipe 14 or directly introduced into the body of catalyst which is above cone shaped bottom 13. The pressure in the regenerator at the point of air inlet may be about 12 or 13 pounds per square inch. The pressure at the bottom of cone bottom 13 may be about 16 pounds per square inch. The pressure at the top of the regenerator may be about 9 pounds per square inch.

Some catalyst may be carried overhead with regeneration gases through line 46 to primary cyclone separator 47 which may operate at about 8½ pounds pressure and may be provided with a dip leg or standpipe 48 about 40 or 50 feet long. Gases from the primary cyclone may be introduced through line 49 to secondary cyclone 50 at a pressure of about 8 pounds, this secondary cyclone being at a higher elevation than the primary cyclone so that its dip leg 51, which discharges into standpipe 48, will be long enough to provide the necessary head of catalyst for balancing the pressure differential. Gases from secondary cyclone 50 may be passed by line 52 to tertiary cyclone 53 which may operate at about 7½ pounds pressure and from which the regeneration gases may be taken through line 54 to a suitable heat exchanger and Cottrell precipitator for recovering the final traces of catalyst. Tertiary cyclone 53 is at a higher elevation than secondary cyclone 50 and dip leg 55 returns the catalyst from the tertiary cyclone to standpipe 48.

Standpipe 48 may be aerated by steam introduced through line 56. The catalyst in the base of this standpipe may be at a pressure of about 16 to 17 pounds per square inch. This catalyst may be discharged through valve or star feeder 57 and introduced by line 58 at a point below the air inlets by means of steam introduced through line 59 at a pressure of about 14 or 15 pounds per square inch.

It should be understood, of course, that instead of mounting cyclones 47, 50 and 53 outside of the regenerator these cyclones may be positioned inside of the regenerator and at the top thereof. In this case the cyclone dip legs will simply extend into the settled catalyst below the point of air inlet and since the density of separated catalyst in the dip legs will be greater than the density of the turbulent catalyst suspension in the upper part of the regeneration tower the catalyst will flow downwardly in the dip legs and the head of catalyst in the dip legs will balance the difference between the pressure in the cyclones and the pressure in the regenerator respectively. Similarly, cyclones 29, 32 and 35 may be mounted in an enlarged separator superimposed above tower 10.

Instead of employing standpipe 30 and cooler 42 I may reintroduce spent catalyst directly from the upper separation means into the regenerator and control the temperature in the regenerator by means of cooling coils. Various other modifications and alternative arrangements of structure will be apparent to those skilled in the art from the above description.

In Figure 2 I have illustrated a system for obtaining more effective countercurrent regeneration of the catalyst before it is returned to the reactor. In this modification a funnel-shaped separator is provided in the lower part of the regenerator. The cone-shaped top 60 of this separator is welded to tower 10 at its outer edge and this cone-shaped member forms the base of the upper regeneration zone. A standpipe 61 depends from the center of this cone-shaped member 60. Flow of catalyst through this central tube or standpipe is regulated by slide valve or other suitable means 62 externally operated by manual or automatic control means 63. Aeration may be effected in this standpipe by means of steam or air introduced through line 64.

In this case the primary regeneration air from line 15 is directed upwardly by cone-shaped distributor 65 for dispersing catalyst into the space between standpipe 61 and the tower walls. With a vertical gas velocity in this space of about 1 to 2 feet per second there will be a dense turbulent phase of suspended catalyst in this space. If the amount of carbonaceous material which is removed from the catalyst in this space is sufficient to cause unduly high temperatures, I may employ suitable cooling coils 66 for removing heat of combustion or I may recycle catalyst from this zone through an external cooler and then introduce the catalyst back to the zone for maintaining temperature.

Gases from the upper part of this lower regeneration zone are withdrawn through relatively large conduit 67 and are employed for dispersing catalyst introduced through line 45 into the upper regeneration zone where the bulk of the regeneration is effected. Here again regeneration is effected while the catalyst is suspended in a dense turbulent phase which is maintained by keeping the vertical gas velocities at about 1½ to 3 feet per second.

Catalyst settles from the dense turbulent phase in the upper zone into a relatively dense layer 68 which is maintained in fluent form by aeration gas introduced through line 64 and if desired or necessary by additional aeration gas introduced above cone-shaped member 60. This fluent dense catalyst flows downwardly through standpipe 61 and is dispersed in primary regeneration air in the lower regeneration zone. Regenerated catalyst settles out of the lower regeneration zone to form a relatively dense fluent layer 69 which is aerated and stripped by steam introduced by line 23 and by additional steam introduced above cone-shaped member 13. This regenerated catalyst then flows through pipe 14 to the reactor as hereinabove described.

While vertical gas velocities have been described for a particular catalyst in a particular unit it should be understood that these gas velocities may vary with other catalysts and with other structural designs. Also, it should be understood that I may employ any number of regeneration zones of the type illustrated in Figure 2. If the amount of air introduced into the upper zone with the spent catalyst causes unduly high gas velocities in said upper zone I may enlarge the diameter of the tower at this point so that the vertical gas velocities will in all cases be critically adjusted so as to maintain the dense turbulent catalyst suspension that is desired for effective regeneration.

An outstanding feature of the invention is the savings in superstructure which is effected by superimposing the regenerator directly over the reactor and utilizing the pressure head in the regenerator for introducing catalyst into the reactor, thus avoiding the extremely long standpipes that have heretofore been required for this purpose. Another feature of the invention is the introduction of spent catalyst into the regenerator at a point which is higher than the air inlet so that the partially regenerated catalyst will pass through a zone of high oxygen concentration before it is separated from regeneration gases and returned for reuse. Other features of the invention will be apparent from the above description but it should be understood that my invention is not limited to the details hereinabove described nor to the conditions of operation hereinabove set forth.

I claim:

1. A catalytic conversion system which comprises a reactor, means for introducing hot hydrocarbon vapors and powdered catalyst at the lower part of said reactor and for withdrawing reaction products with suspended catalyst from the upper part of said reactor, a regenerator superimposed above said reactor, means for introducing air into the regenerator in a plane spaced from but near to the bottom of the regenerator, means above the level of the top of the regenerator for removing spent catalyst from the vapors withdrawn from the reactor, means for introducing said spent catalyst into the regenerator at a higher plane in the regenerator than the plane of air introduction, said air introduction means being designed to permit catalyst to settle to the lower part of the regenerator, means for removing regenerated catalyst from regeneration gases leaving the upper part of the regenerator and for returning said separated regenerated catalyst to the regenerator and a conduit extending directly from the lower part of the regenerator to the lower part of the reactor whereby the pressure head in the regenerator is superimposed on the pressure head in the conduit in order to provide a greater pressure at the base of the conduit than the pressure existing in the base of the regenerator.

2. In a hydrocarbon conversion system an upflow reactor, means for introducing reactor vapors at a low point in said reactor, means for withdrawing reaction products together with suspended catalyst from the upper part of said reactor, a regenerator superimposed over said reactor and having a conduit extending from a lower part thereof to said reactor for returning regenerated catalyst to said reactor, means above the level of the regenerator for separating spent catalyst from reaction products, means for introducing said separated spent catalyst into an upper point in said regenerator, means for introducing air into said regenerator in a plane below the point of catalyst introduction and above the point of catalyst withdrawal, means for separating regenerated catalyst from gases leaving the upper part of said regenerator and for returning said separated catalyst to a lower part of the regenerator and means for regulating the amount of catalyst introduced from said conduit into the lower part of said reactor.

3. A unitary conversion-regeneration system for powdered catalyst which system comprises an up-flow reaction chamber, means for introducing charging stock vapors and powdered catalyst at a low part of said chamber, means for withdrawing spent catalyst and reaction products from an upper part of said chamber, means for separating spent catalyst from reaction products, a regeneration chamber, means for introducing spent catalyst at an upper part of the regeneration chamber at a point below the top thereof and for withdrawing regenerated catalyst from the lower part of said regeneration chamber, means for introducing air into the regeneration chamber between the point at which catalyst is introduced and the point at which catalyst is withdrawn therefrom, means for passing the air and combustion products resulting therefrom upwardly through the regeneration zone at such vertical velocity as to maintain a dense phase catalyst suspension in the regeneration chamber and a conduit leading directly from a lower part of the regeneration chamber to a lower part of the reactor whereby the pressure head in the regeneration chamber is superimposed on catalyst which is discharged through said conduit to the lower part of the reactor.

4. A catalytic conversion system which comprises a unitary tower structure, a partition in said tower structure for separating it into an upper regenerator section and a lower reactor section, a conduit extending from said partition to a low point in the reactor section whereby powdered solids may pass from the regenerator section through said conduit directly to said reactor section, means for introducing a vaporized hydrocarbon charge at a low point in said reactor section for suspending catalyst introduced thereto through said conduit, a product-catalyst discharge line leading from the upper part of the reactor section, means for separating relatively spent catalyst from products, a heat exchanger for cooling separated spent catalyst, means for passing separated spent catalyst through said heat exchanger and thence to the regenerator section, means for introducing air through a distributor at a low point in the regenerator section, means for withdrawing gases from the upper part of the regenerator section and means for separating regenerated catalyst from regeneration gases and for returning said regenerated catalyst to said regenerator section whereby the regenerated catalyst may be returned through said substantial vertical conduit to said reactor section.

5. The system of claim 4 wherein the means for returning separated spent catalyst to the regenerator section includes a catalyst introduction line terminating in the upper part of the regenerator.

6. In a hydrocarbon conversion system wherein conversion is effected in an up-flow reactor, catalyst is separated from conversion products, regenerated in a regenerator and then returned to the base of the reactor, the method of operation which comprises introducing spent catalyst at an upper part of the regenerator, introducing air at an intermediate point in the regenerator in such amounts as to maintain a vertical gas velocity in the regenerator between the air inlet and the catalyst inlet of about 1 foot per second whereby a dense turbulent phase of suspended catalyst is maintained in the upper part of the regenerator, passing the bulk of the catalyst from the upper part to the lower part of the regenerator whereby partially regenerated catalyst passes through a zone of high oxygen concentration before it leaves the regeneration zone, and returning regenerated catalyst directly from the base of said regeneration zone to the base of the conversion.

7. The method of claim 6 which includes the step of cooling spent catalyst prior to introducing it at the upper part of the regenerator.

EVERETT A. JOHNSON.

REFERENCES CITED

The following references are of record in the file of this patent:

UNITED STATES PATENTS

| Number | Name | Date |
|---|---|---|
| 2,231,424 | Huppke | Feb. 11, 1941 |
| 2,248,196 | Plummer | July 8, 1941 |
| 2,304,128 | Thomas | Dec. 8, 1942 |

FOREIGN PATENTS

| Number | Country | Date |
|---|---|---|
| 23,045 | Great Britain | May 2, 1911 |
| 533,037 | Germany | Sept. 8, 1931 |